June 22, 1937. B. C. PLACE 2,084,624
FASTENER
Filed Nov. 14, 1935
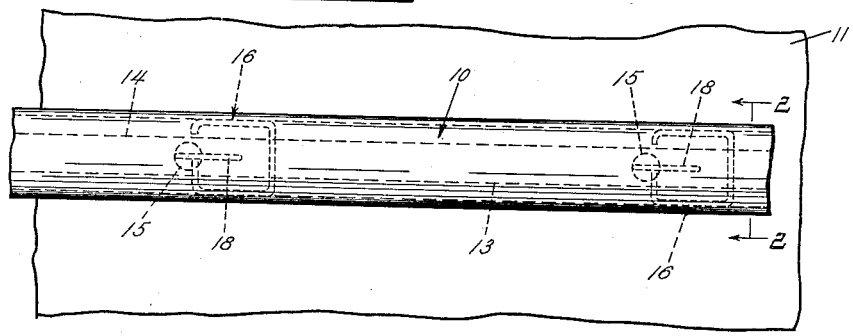
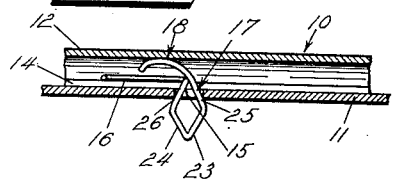 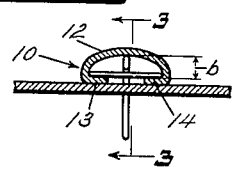
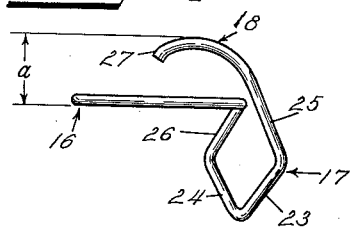 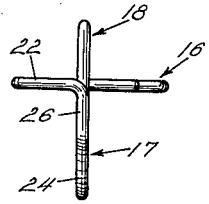 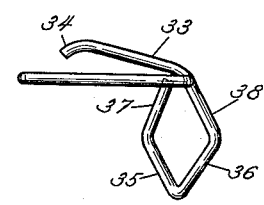
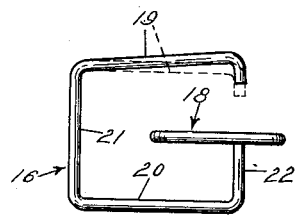 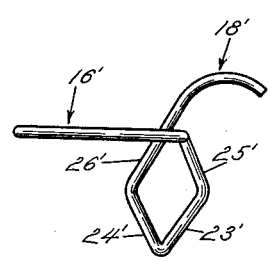 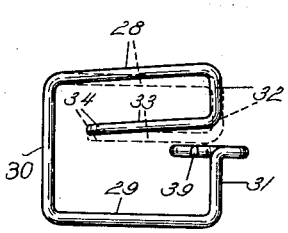
Inventor
Bion C. Place
By Strauch & Hoffman
Attorneys Patented June 22, 1937

2,084,624

UNITED STATES PATENT OFFICE 2,084,624

FASTENER

Bion C. Place, Detroit, Mich., assignor of one-half to George E. Gagnier, Detroit, Mich.

Application November 14, 1935, Serial No. 49,854

12 Claims. (Cl. 20—74)

This invention relates to an improved spring or stud fastener designed especially for use in securing hollow moldings of well known form. More particularly, the present invention involves a fastener that is effectively supported from movement with respect to the fasteners, when the latter are moved into holding position.

In securing moldings to various parts of automobiles or the like, it is now customary to use spring stud fasteners which are assembled with their heads in the moldings and their shanks protruding therefrom. The latter are then sprung or snapped in perforations or openings in the structure to which the molding is attached. In springing the shanks of the fasteners in said perforations or openings considerable pressure is applied to force the fasteners into holding position and to contract their shanks in so doing.

The primary object of the present invention is to provide a fastener of a form capable of successfully withstanding the pressure or force used in bringing about the engagement of the shank of the fastener with its opening or socket regardless of the shape of the molding.

Another object of the invention is to provide a stud fastener for moldings having a head formed to bear yieldingly against three angularly related walls of the molding, whereby the fastener is adequately supported for the operation of springing its shank in the socket provided to receive it.

Still another object of the invention is to provide a molding fastener having a spring arm located above the head and in position to contact with the inside of the top of the molding.

A still further object of the invention is to provide the shank of a stud fastener with an arm designed to engage a molding and provide a support for the shank during the operation of inserting it in its socket.

Other objects of the invention will appear as the description thereof proceeds with reference to the accompanying drawing, in which Figure 1 is a fragmentary plan view showing a fragment of a molding secured by a fastener of the present invention.

Figure 2 is a sectional view taken on the plane indicated by the line 2—2 in Figure 1 looking in the direction of the arrows.

Figure 3 is a sectional view taken on the plane indicated by the line 3—3 in Figure 2 looking in the direction of the arrows.

Figures 4, 5 and 6 are respectively side, top and end views of the fastener included in Figures 1, 2 and 3.

Figure 7 is a view corresponding to Figure 4 but showing a modified form of fastener.

Figures 8 and 9 are respectively top and side views of a still further modification.

Like reference characters indicate like parts throughout the several figures.

The fastener of the present invention is particularly intended to secure hollow moldings, such as the molding 10 upon a supporting structure 11. The hollow molding 10 may assume any desired form, such as that illustrated by Figure 2 of the drawing, in which said molding comprises a body portion 12 and inturned flanges 13 and 14 spaced relatively widely from the body portion 12, which constitutes the top portion of the molding. In order that the molding 10 may be secured upon the supporting structure 11, the latter is provided with perforations or openings 15 for the reception of the shank or holding part of the spring stud fastener of the present invention.

A preferred form of said fastener as illustrated in Figures 4, 5 and 6 of the drawing, and comprises three parts, a head 16, a shank 17 and an arm 18 located above the head 16. Preferably the fastener is constructed from a single piece of stiff and resilient wire by bending the one end of said piece of wire into the form of a substantially closed loop, said loop comprising approximately parallel portions 19 and 20 connected together by a connecting portion 21. Preferably the portion 19 diverges slightly from a line exactly parallel to the portion 20, it being contemplated that in inserting the fastener in a hollow molding, presently to be described, the portion 19 shall be bent toward the dotted line position illustrated in Figure 5 in which position the portion 19 would be parallel to the portion 20. The head 16 of the fastener includes, in addition to the portions 19, 20 and 21, a portion 22 which carries the shank 17 of the fastener; said shank comprises only a portion of the wire likewise bent in the form of a substantially closed loop of approximately a diamond shape or oval form as illustrated. The portions 23 and 24 of said loop constitute inclined guiding surfaces which engage the wall of the opening or perforation in which the shank of the fastener is inserted and cause, when pressure is applied to the fastener, a contraction of the shank in the manner now well understood in the art. The shank 17 also includes the portions 25 and 26, the exterior surfaces of which provide inclined holding shoulders which engage, when the fastener is in holding position, with the corners of the opening 15 in the supporting structure in the manner illustrated by Figure 3 of the drawing. Preferably the fastener is formed so that the arm 18 constitutes a continuation of the portion 25 of the shank of the fastener as illustrated, the arm 18 terminating in a curved portion 27 directed toward the head 16.

However, if desired, the fastener may be constructed in the manner illustrated in Figure 7 of the drawing, in which the arm 18' is carried by the portion 26' of the shank of the fastener. The arm 18' thus projects to one side of the loop constituting the head 16' of the fastener of this form of the invention. The fastener in Figure 7 is constructed by bending the portion of the wire forming the part of the portion 25' of the shank at an obtuse angle to the head, and by then bending the wire into loop shaped forms as illustrated. In the form of the invention illustrated in Figure 6, the wire is first bent at an acute angle to the plane of the head 16 and then bent counterclockwise to form the loop constituting the shank of the fastener. The head 16' of the fastener illustrated in Figure 7 corresponds exactly to the head 16 of the fastener of Figures 4, 5 and 6.

If desired, the functional and structural equivalent of the fastener of this invention may be produced by forming the head of the fastener so that it comprises approximately parallel portions 28 and 29 connected together by a portion 30. Said head may also comprise a portion 31 of the fastener, which in this form of the invention carries the shank which is constructed from the end of the piece of wire from which the fastener is made. The head of the fastener also includes a portion 32 integrally connected to the portion 28, the portion 32 carrying a spring arm 33 bent within the loop of the head but disposed substantially above the head as illustrated in Figure 9. The end 34 of the arm 33 is curved downwardly toward the plane of the head of the fastener.

The shank of the fastener of this form of the invention consists simply of the loop of diamond or oval form providing guiding portions 35 and 36 corresponding in structure and function to the portions 23 and 24 of the fastener first described, and holding portions 37 and 38 corresponding in structure and function to the holding portions 25 and 26 of the fastener first described. In this form of the invention one end 39 of the piece of wire is disposed within the loop formed by the portions 28, 29, 30, 31 and 32 while the other end is located at the end of the curved portion 34 of the arm 33.

The several fasteners just described are all used in the same manner. Referring to the fastener of Figures 4, 5 and 6, for example, when it is desired to secure a molding by means of such fastener, the head 16 and the arm 18 are inserted within the hollow molding, preferably from an end thereof, and slid along the molding to a position along the length thereof at which the shank of the fastener will register with an aperture or opening in the supporting structure when the molding is applied thereto. The fastener is so designed that when it is inserted in the hollow molding from the end thereof, the arm 18 is bent toward the head 16, that is, the dimension $a$ in Figure 4 is greater than the dimension $b$ in Figure 2. As a result, when the fastener is inserted in the molding, the arm 18 contacts firmly with the underside of the top of the molding while the portions 19 and 20 of the head are caused to bear firmly against the inside of the flanges 13 and 14. The fastener thus contacts against three sides of the molding which sides are angularly related to each other. Preferably the width of the head of the fastener, measured across the portions 19 and 20, referring to the form of fastener illustrated in Figures 4, 5 and 6, exceeds the inside width of the molding, so that when the head of the fastener is inserted in the hollow molding, portion 19 is pressed toward the portion 20, so that the head of the fastener fits snugly between apertured walls of the molding, while the arm 18 presses the head into contact with the flanges 13 and 14. The fastener accordingly will remain in position at any point along the length of the molding to which it is slid.

As many fasteners are applied to the hollow molding, in the manner just described, as there are openings 15 in the supporting structure, a fastener being disposed within the molding opposite each opening 15. After the fasteners have been assembled with respect to the molding, the molding is then ready for application to the support. In applying the molding to the supporting structure, the protruding shanks of the fastener which project substantially beyond the flanges 13 and 14, as illustrated, are entered in the openings 15 and 16 and pressure is applied against the top of the molding. In forcing the shanks of the fasteners in said openings, the arms 18 serve to prevent the shank of the fastener from becoming distorted in the operation of forcing it through the openings. The arm 18' functions in the same manner. After the shanks of the fastener have been forced into the openings in the supporting structure, the molding is firmly held in place by engagement of the holding surfaces 25 and 26 with corners of the opening in the supporting structure as illustrated.

The arm 33 of the fastener illustrated in Figures 8 and 9, unlike the arms 18 and 18', does not serve to support the shank of the fastener when it is entered in the opening in the supporting structure, reliance being placed in this figure upon the stiffness of the arm 31 to support said shank. However, the fastener of Figures 8 and 9 fits immovably in the molding as in the other forms of this invention inasmuch as it contacts with three angularly related walls of the molding on three parallel lines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A stud fastener comprising a head in the form of a substantially closed loop formed from one portion of a piece of stiff resilient wire, a shank also in the form of a substantially closed loop disposed in a plane normal to the plane of said first named loop and formed from another portion of said piece of wire, and a spring arm disposed above said first named loop and formed from an end of said piece of wire.

2. A wire stud fastener comprising a head in the shape of a substantially closed loop formed from one end of a piece of wire, a shank carried by a single arm disposed in the plane of said head, said shank being formed from the other end of said piece of wire, and an arm projecting from said shank over said head, said arm being yieldable toward and from said head.

3. A wire stud fastener comprising a head of rectangular form, a shank carried by a single leg depending from said head, said shank being in the form of a substantially closed loop, and an arm projecting from said shank over said head, said arm being yieldable toward and from said head.

4. A headed stud fastener having a shank consisting solely of a single resilient leg extending to the end of the shank and a portion bent back toward the head and extended beyond and over said head to form a spring arm overlying the head, said last named portion also having a holding shoulder to engage the corner of a perforation of a supporting structure when said shank is snapped therein.

5. A stud fastener comprising a head formed from a portion of a piece of wire by bending said portion into the shape of a substantially closed loop, an arm extending above said loop, and a shank depending from said loop and consisting only of a single leg the end of which is bent back toward the head, the bent-back portion being provided with a shoulder spaced from the head.

6. A stud fastener constructed of a single piece of wire and comprising a head formed from portions of said piece of wire, said head having two approximately parallel portions designed to resiliently engage opposite parallel walls of a hollow molding or the like, a third portion to resiliently engage the top wall of said hollow molding, and a shank in the form of a loop depending from said head and carrying said third portion.

7. A stud fastener constructed of a single piece of wire and comprising a head formed from one end of said piece of wire, said head having two approximately parallel portions one of which is freely movable at one end toward the other portion, a spring arm formed from the other end of said piece of wire and being disposed at one side of said head and being freely movable in a plane normal to the plane of said approximately parallel portions, and a shank in the form of a loop connected at one side to one of said parallel portions and at the other side to said arm.

8. A stud fastener comprising a head having two straight portions approximately parallel to each other, one of said portions terminating in a movable free end, said last named portion diverging slightly toward said free end, a third curved portion forming a spring arm having a free end movable in a plane normal to the plane of movement of said first named free end, and an expansible and contractible loop in the same plane as said arm.

9. A stud fastener for a molding or the like, consisting of a head of rectangular form, a shank consisting of a single leg bent to provide a loop designed to be compressed when passed through an opening and to then expand after passage through said opening, and a spring arm disposed above said head.

10. A spring stud fastener comprising a head having two approximately parallel portions in one plane, a shank consisting of a loop disposed in a perpendicular plane paralleling said portions, and a spring arm disposed in the plane of said shank and above and between said parallel portions.

11. In combination, a hollow molding having spaced inturned flanges, and a fastener having an elongated head expanded within the corners formed by said flanges and against the body of said molding between said corners and a shank in the form of a loop depending from one end of said head, said loop being disposed in a plane parallel to the edges of said flanges.

12. In combination, a hollow molding having spaced inturned flanges, and a spring fastener having three portions bearing yieldingly against inside walls of said molding, two of said portions acting in opposition to each other in one plane and the third portion acting in a plane normal to said first named plane and a shank extending from said molding between said flanges, said shank being formed to provide yielding holding shoulders and with means to cause its contraction when forced through a perforation in a supporting structure for the molding.

BION C. PLACE.